US 9,911,533 B2

(12) United States Patent
Casanova et al.

(10) Patent No.: US 9,911,533 B2
(45) Date of Patent: Mar. 6, 2018

(54) CAPACITOR WITH PRESSURE INTERRUPTER

(71) Applicant: Cornell Dubilier Electronics, Inc., New Bedford, MA (US)

(72) Inventors: Hector Arsenio Casanova, Tiverton, RI (US); Rui Miguel Batista, New Bedford, MA (US); Edward Martin Lobo, Taunton, MA (US); Paul Mathew Jan Jorissen, Jr., South Dartmouth, MA (US)

(73) Assignee: Cornell Dubilier Electronics, Inc., New Bedford, MA (US)

( * ) Notice: Subject to any disclaimer, the term of this patent is extended or adjusted under 35 U.S.C. 154(b) by 120 days.

(21) Appl. No.: 15/194,965

(22) Filed: Jun. 28, 2016

(65) Prior Publication Data

US 2017/0372838 A1    Dec. 28, 2017

(51) Int. Cl.
| | |
|---|---|
| *H01G 9/08* | (2006.01) |
| *H01G 2/18* | (2006.01) |
| *H01G 2/10* | (2006.01) |

(52) U.S. Cl.
CPC .............. *H01G 2/18* (2013.01); *H01G 2/103* (2013.01); *H01G 9/08* (2013.01)

(58) Field of Classification Search
CPC .......... H01G 2/18; H01G 2/103; H01G 4/224; H01G 9/08; H01G 9/10; H01G 9/12
See application file for complete search history.

(56) References Cited

U.S. PATENT DOCUMENTS

| | | | | |
|---|---|---|---|---|
| 2,274,327 A | * | 2/1942 | Georgiev | H01G 9/12 361/521 |
| 3,555,370 A | * | 1/1971 | Bowling | H01G 9/10 174/564 |
| 4,106,068 A | | 8/1978 | Flanagan | |
| 4,283,750 A | | 8/1981 | Deschanels et al. | |
| 4,577,257 A | | 3/1986 | Erhardt et al. | |
| 4,586,107 A | | 4/1986 | Price | |
| 4,639,827 A | | 1/1987 | Strange et al. | |
| 4,754,361 A | * | 6/1988 | Venturini | H01G 4/224 361/15 |
| 5,148,347 A | | 9/1992 | Cox et al. | |

(Continued)

FOREIGN PATENT DOCUMENTS

| | | |
|---|---|---|
| DE | 2402501 A1 | 7/1975 |
| DE | 102004038368 A1 | 3/2006 |

(Continued)

*Primary Examiner* — Dion R Ferguson
(74) *Attorney, Agent, or Firm* — Timothy J. Monahan; Monahan & Company, LLC

(57) ABSTRACT

A capacitor is provided with a case having a receptacle with an expandable section that allows the receptacle to extend axially when internal pressure builds within the case as a result of a fault. Terminals are mounted on the cover and electrically connected to the electrodes of a capacitor element through an interrupter plate, via leads. The plate is attached to the section of the case that extends under pressure, whereby the plate is drawn away from the cover, thereby breaking the electrical connections to the terminal. The plate may also work in conjunction with a cover that expands outward in response to internal pressure, to provide a second pressure interrupter mechanism.

20 Claims, 7 Drawing Sheets

(56) References Cited

U.S. PATENT DOCUMENTS

| | | | |
|---|---|---|---|
| 5,222,899 A | 6/1993 | Hulderman | |
| 5,381,301 A | 1/1995 | Hudis | |
| 6,084,764 A | 7/2000 | Anderson | |
| 6,313,978 B1 | 11/2001 | Stockman et al. | |
| 6,819,545 B1 * | 11/2004 | Lobo | H01G 9/12 361/15 |
| 6,930,874 B2 | 8/2005 | Lobo et al. | |
| 7,206,186 B1 | 4/2007 | Knight et al. | |
| 7,274,551 B1 | 9/2007 | Parler, Jr. et al. | |
| 8,098,479 B1 | 1/2012 | Parler, Jr. et al. | |
| 8,537,522 B2 | 9/2013 | Stockman | |
| 8,891,224 B2 | 11/2014 | Stockman | |
| 9,466,429 B1 | 10/2016 | Casanova et al. | |
| 2006/0227495 A1 | 10/2006 | Stockman | |
| 2015/0325383 A1 * | 11/2015 | Yoneda | H01G 9/12 361/512 |

FOREIGN PATENT DOCUMENTS

| | | | |
|---|---|---|---|
| EP | 2073224 A2 | 6/2009 | |
| FR | 2782411 A1 | 2/2000 | |

\* cited by examiner

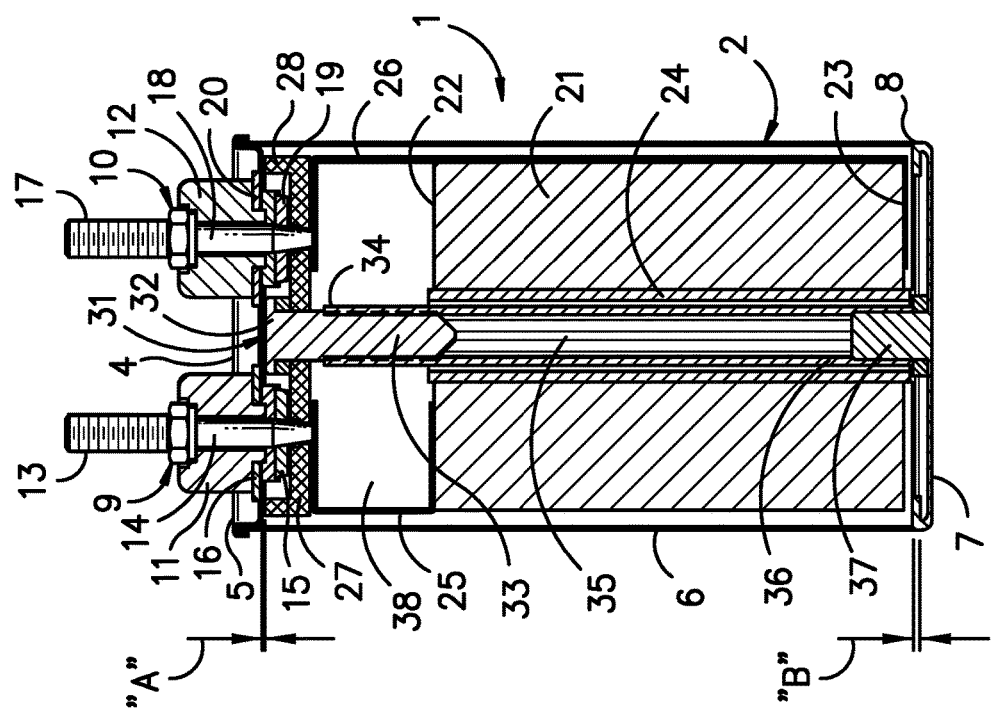
FIG. -2-
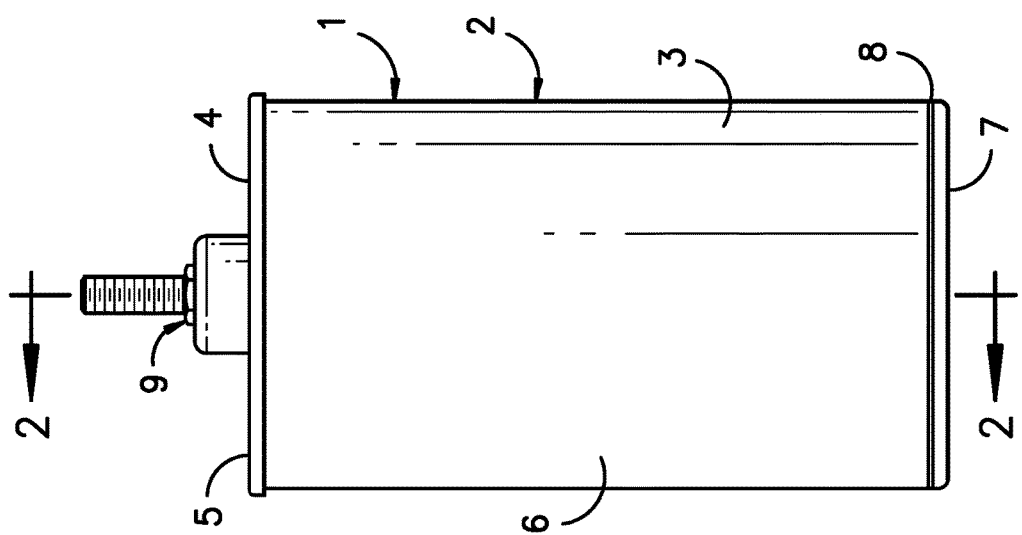
FIG. -1-

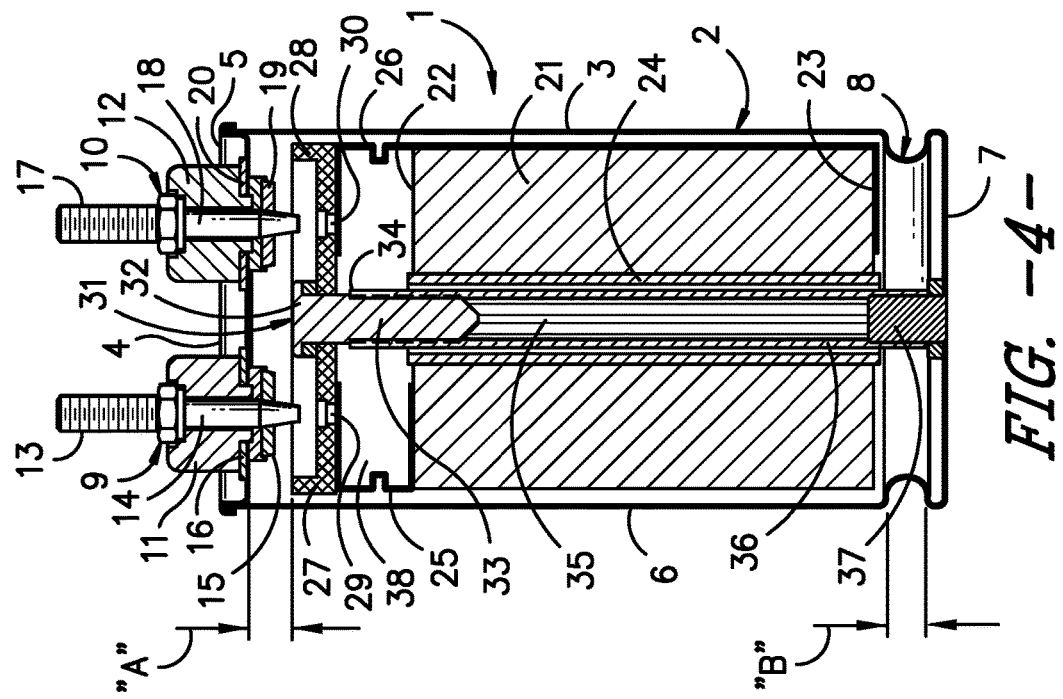
FIG. -4-
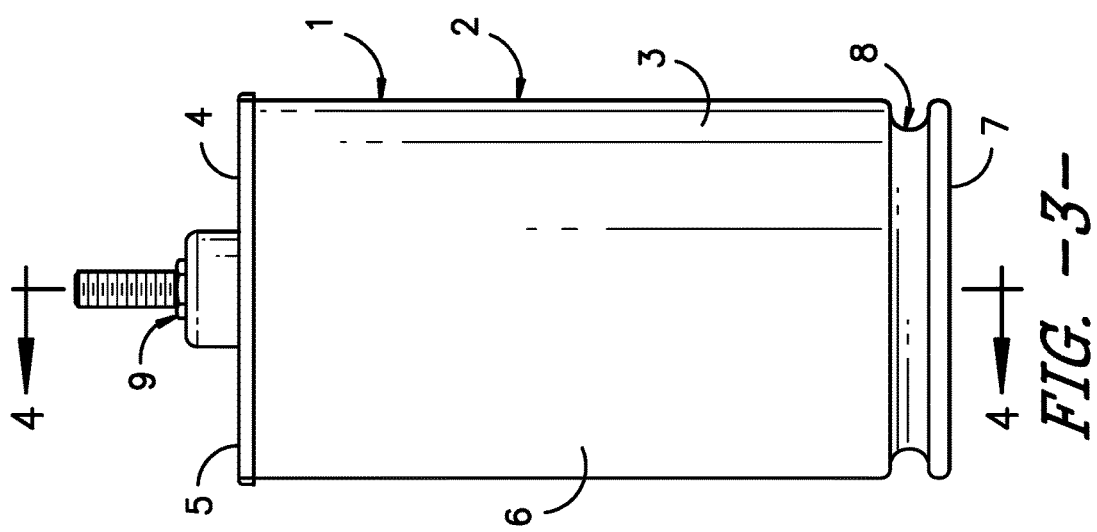
FIG. -3-

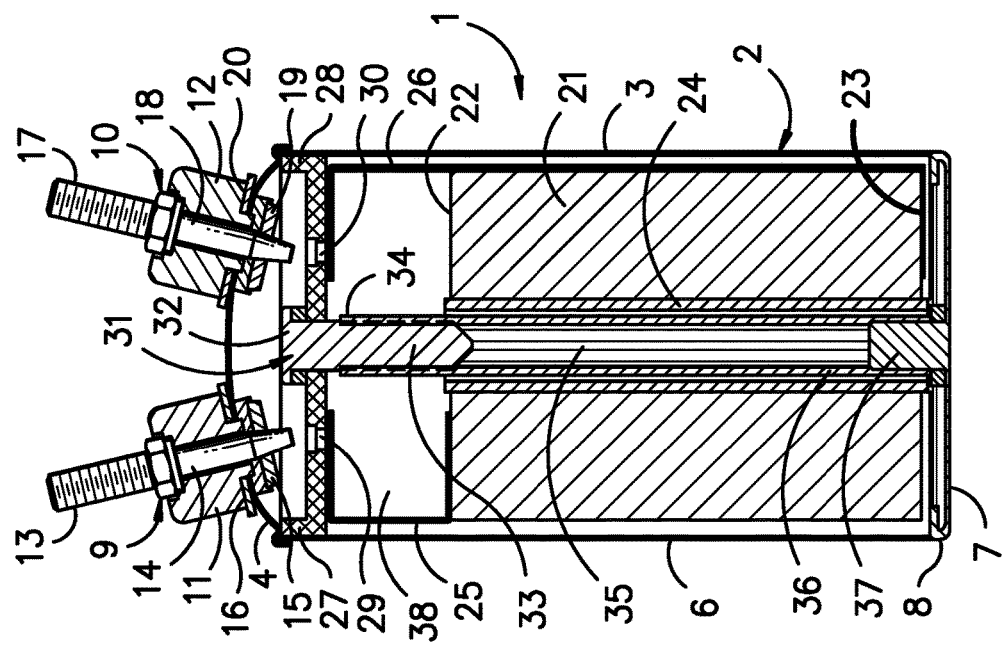
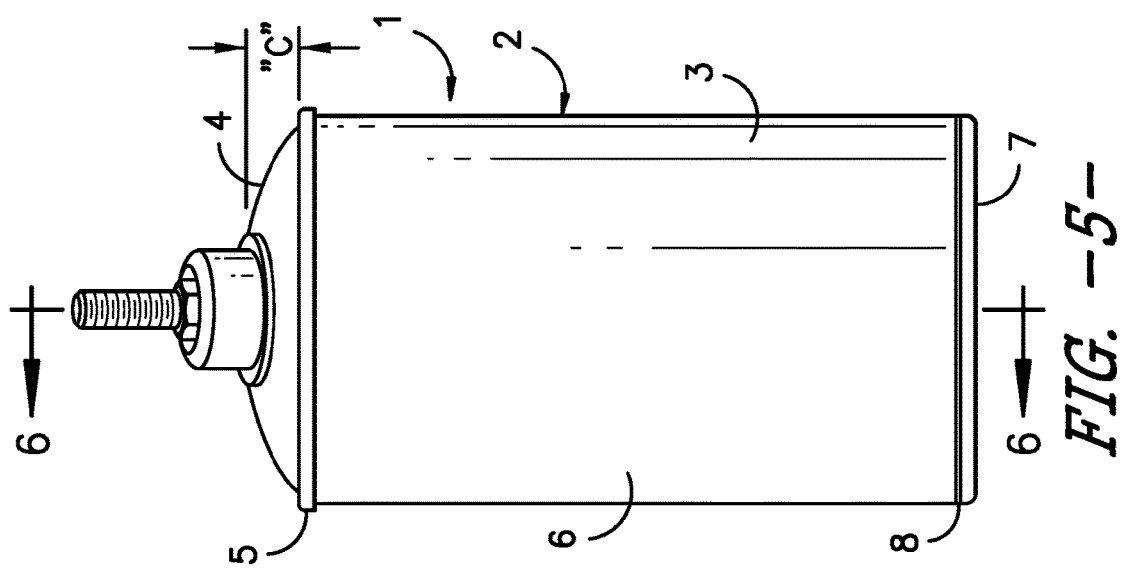

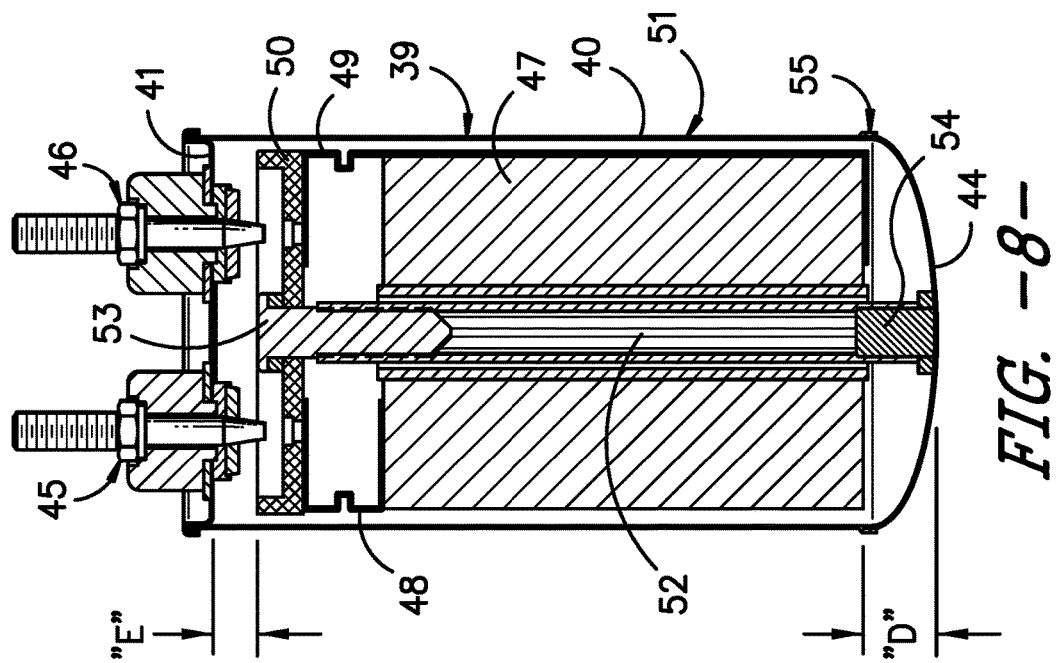
FIG. -8-
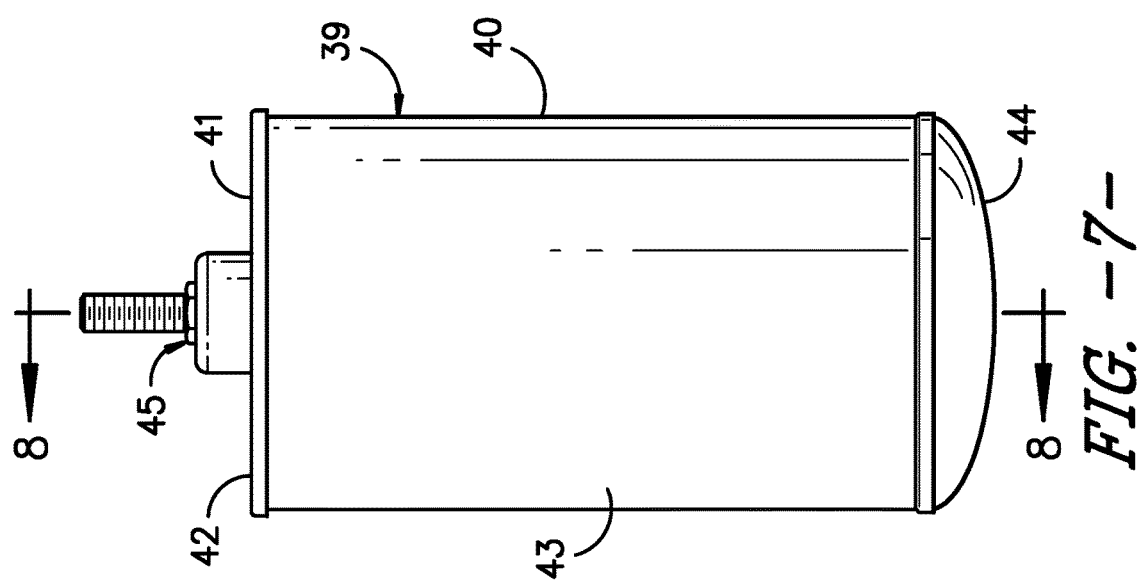
FIG. -7-

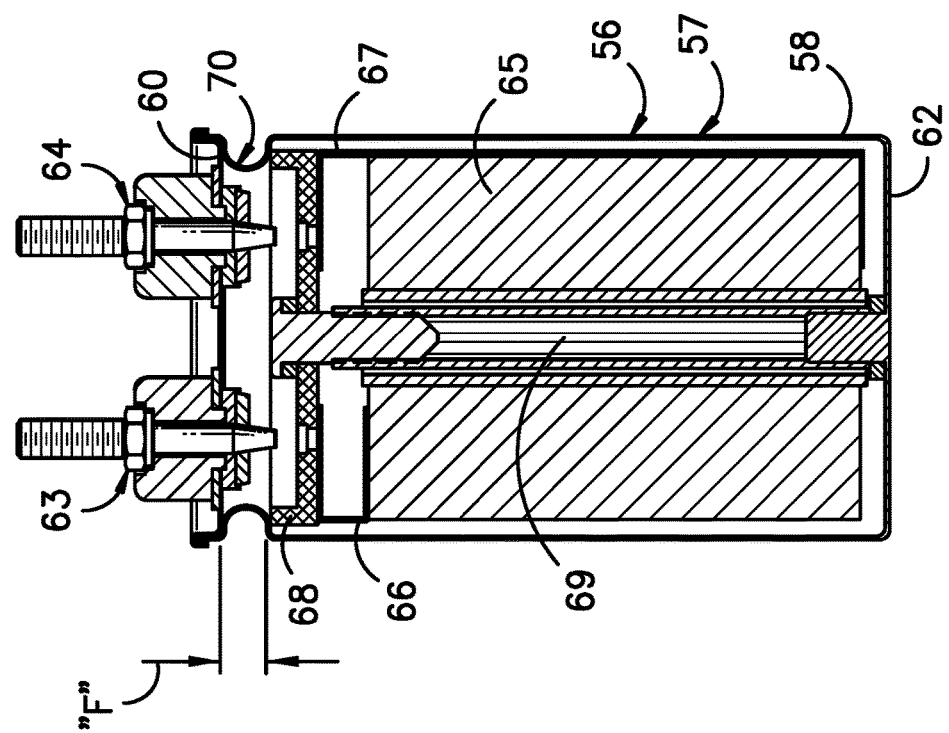
FIG. -10-
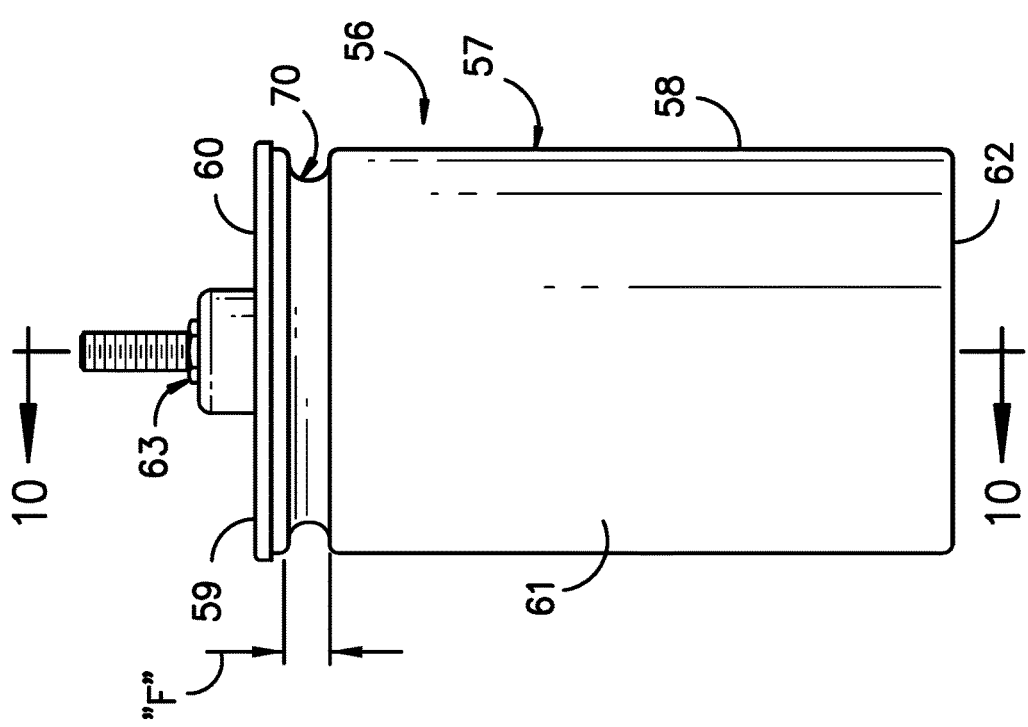
FIG. -9-

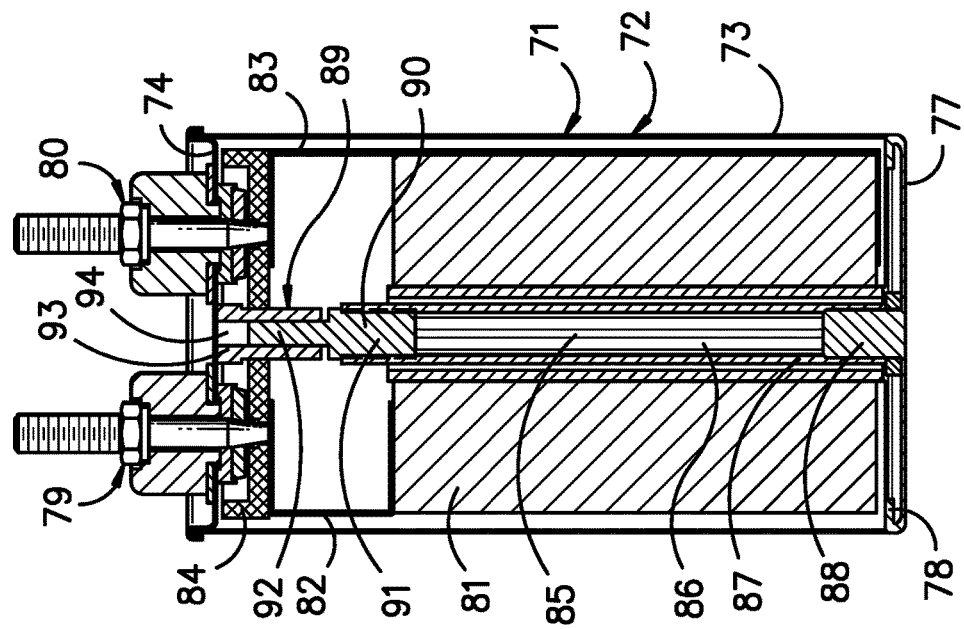
FIG. -12-
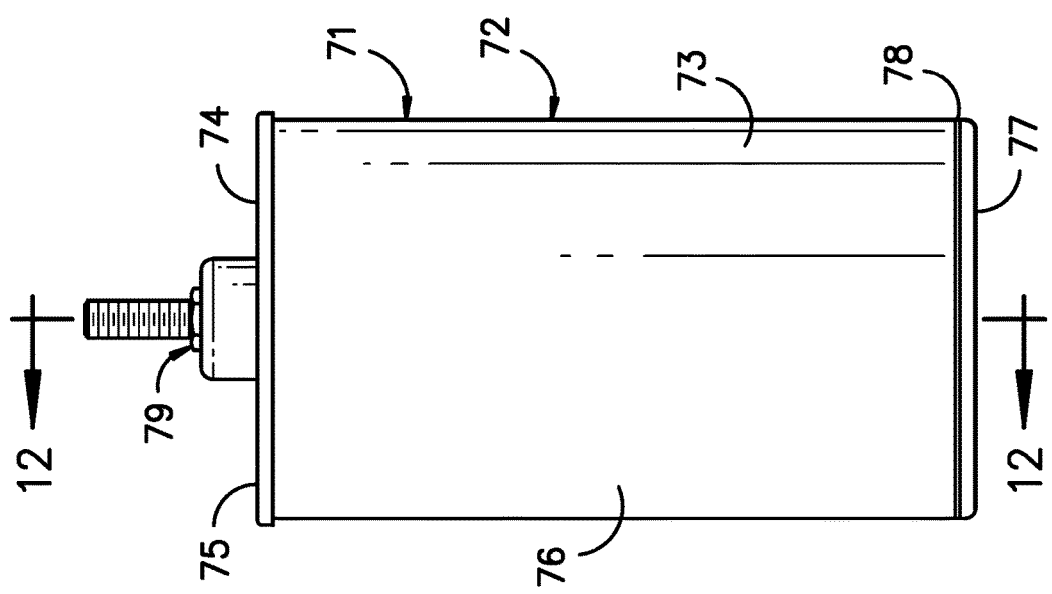
FIG. -11-

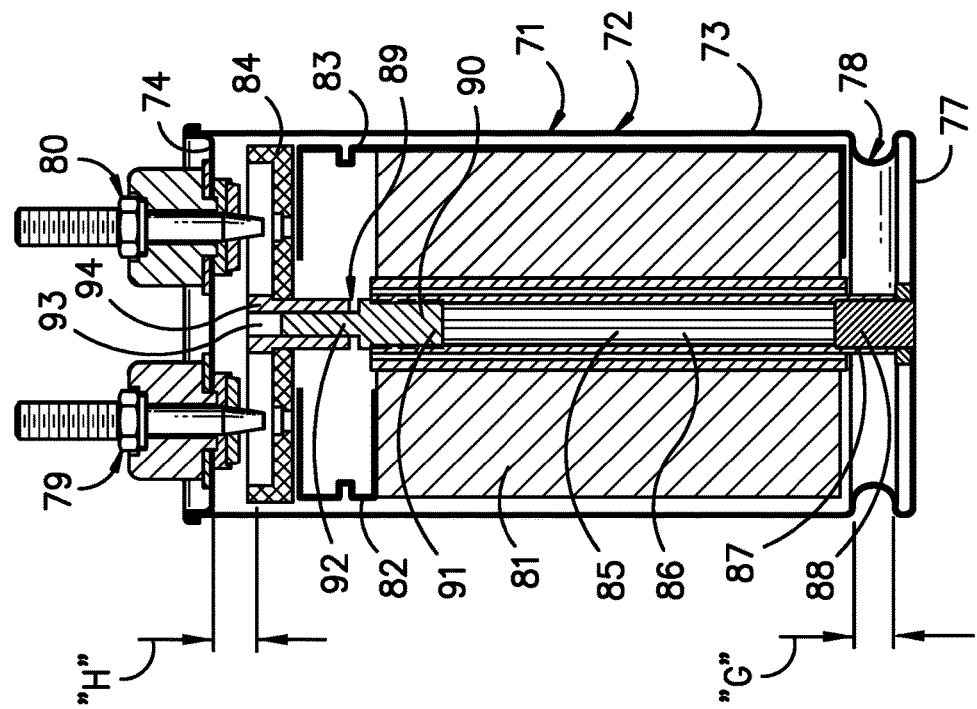
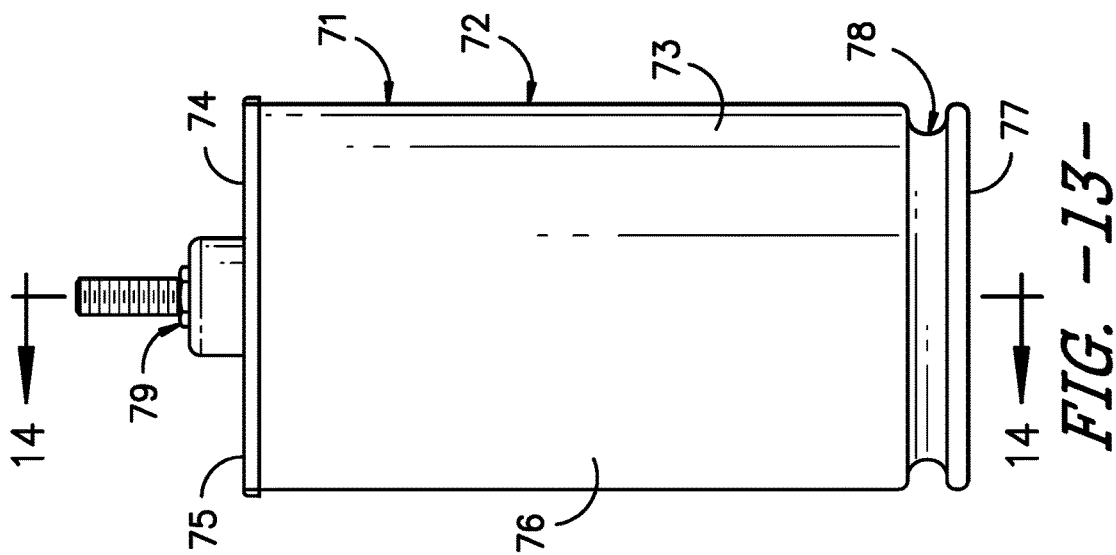

CAPACITOR WITH PRESSURE INTERRUPTER

The present invention is directed to a capacitor having a receptacle that expands axially under pressure. An interrupter plate is positioned in the capacitor and attached to the receptacle. The interrupter plate is pulled away from one or more terminals mounted on the cover of the case, when the receptacle expands, thereby breaking the electrical connection to the terminals. The capacitor may be provided with a second interrupter mechanism, which activates when the cover expands outward under pressure away from the plate, thereby breaking the electrical connection to one or more terminals mounted on the cover.

BACKGROUND OF THE INVENTION

Certain capacitors are required to be provided with a pressure interrupter, that is, when pressure builds in the case due to a failure of the capacitor, the case expands, thereby causing a break in the electrical connection between the capacitor element and the terminals mounted on the case.

One type of interrupter is the "bridge" type interrupter, shown in Flanagan—U.S. Pat. No. 4,106,068. The capacitor terminals may be mounted on a flexible cover, which seals the capacitor case. Rivets on the bottom of the terminals extend through a relatively rigid plate mounted within the case, underneath the cover. Electrical conductors, such as tabs, connect the electrodes of the capacitor elements to the rivets on the underside of the plate, for example, by welding. When pressure builds within the case due to an internal fault, the cover bulges outward, causing the terminals to move away from the rigid plate, thereby breaking the connections between the tabs and the rivets.

An important consideration when a capacitor is installed in an electrical circuit is that there be sufficient clearance to allow the cover to expand and break the connections to the terminals. For example, approximately ½ inch or more of clearance is required between the terminals and any obstruction, to allow the cover to expand outward under pressure. For some applications, however, such as mounting the capacitor on a busbar, it may be difficult to maintain the clearance necessary for the pressure interrupter to function.

Another type of interrupter is the "bellows" type interrupter, shown in Deschanels et al. —U.S. Pat. No. 4,283,750. The body of the case may be provided with an accordion style pleat or collapsed section. When the pressure builds, the case lengthens, and the bottom of the case expands away from the cover. A wire connecting the capacitor element to a terminal mounted on the cover is secured to the capacitor element and is "nicked" or otherwise weakened in one place. When the case expands under pressure, the wire is pulled taut and breaks, thereby disconnecting the terminal from the capacitor element.

Erhardt et al.—U.S. Pat. No. 4,577,257 disclose a capacitor having a housing with a flexible bottom. An electrical conductor is connected at one end to the bottom of the housing, and the conductor is nicked to provide a predetermined breaking point. An increase in the pressure within the housing causes the bottom to flex outward and break the conductor.

A shortcoming of the pressure interrupters of Deschanels et al. and Erhardt et al. is that only the electrical connection between one electrode of the capacitor element and one terminal on the cover of the case is disconnected. Best practice for many applications, however, is that the electrical connections from the capacitor element(s) to all of the terminals be disconnected in the case of an internal fault.

Whether a bridge type or bellows type pressure interrupter is provided with the capacitor, mounting brackets, heavy cables and other structural members may restrict expansion of the capacitor cover or housing at a particular installation. Providing a capacitor with dual pressure interrupters, especially a capacitor having pressure interrupters that depend on the expansion of different components of the case to engage, would greatly decrease the risk of a rupture and venting under internal fault conditions.

SUMMARY OF THE INVENTION

A capacitor is provided having a pressure interrupter mechanism, which overcomes the shortcomings in the prior art, and offers additional features and advantages, as disclosed herein.

The capacitor has a sealed case. The case is made up of a receptacle having an open end, side walls and a bottom positioned opposite the open end. An expandable section is provided in the receptacle. For example, the expandable section may be a bellows positioned in the side walls or adjacent the bottom of the receptacle, or the bottom itself may be flexible, such as a diaphragm. A cover overlays and seals the opening in the receptacle. An increase in pressure within the case, for example, when an internal fault occurs, forces and the receptacle to extend longitudinally, that is, axially away from the open end of the receptacle.

A second pressure interrupter mechanism may be conveniently provided in the capacitor, by providing a flexible cover that expands outwardly, that is, axially away from the open end of the receptacle, under pressure. A feature of the capacitor with dual pressure interrupter mechanisms is that the electrical connections from the capacitor elements to the terminals mounted on the cover of the case may be broken in the same location, that is, at the plate, regardless of whether the distance between the plate and the terminals increases by virtue of the receptacle expanding longitudinally downward or the cover expanding upward under pressure.

A capacitor element having first and second electrodes is positioned in the case. Depending upon the type of capacitor, for example film versus electrolytic capacitor, the case may also contain an insulating oil, electrolyte solution, inert gas, wax, thermoplastic or thermosetting resin or polymer, gel, such as polyurethane gel, and fillers, as is known in the art.

First and second terminals are mounted on the cover of the case. The terminals are electrically insulated from the cover. The terminals extend through the cover, such that each terminal has an external component and an internal component. The external component of the terminal is designed to connect the capacitor to an electrical circuit. For example, the external component may be a threaded post or blade connector having one to four blades.

An electrical connection is provided between the first and second electrodes of the capacitor element and the internal component of the first and second terminals, respectively. For example, the first terminals is connected to the first electrode of the capacitor element by a first conductive lead, and the second terminal is connected to the second electrode of the capacitor element by a second conductive lead. The internal component of each of the terminals may be a post, and the post may be connected to the lead by welding.

In an alternative embodiment of the invention, instead of a single capacitor element, the capacitor may contain multiple capacitor elements, which may be individual wound capacitors or sectors in a multisector, co-wound capacitor, or combinations thereof, within the case. Depending upon how the multiple capacitor elements are configured, for example, in series or in parallel, more than two terminals may be mounted on the cover, with an electrical connection between each of the terminals and at least one electrode of a capacitor element. By way of further example, the capacitor may comprise two, three, four, five, six or more capacitor elements, with three, four, five, six, seven or more terminals mounted on the cover and configured to be connected in parallel, with an electrical connection between each terminal and a first electrode of each capacitor element and an electrical connection between a common terminal and the second electrode of each capacitor element. The terminals are spaced apart to avoid arcing between adjacent terminals, as is known in the art. Examples of capacitors with multiple capacitor elements may be found in U.S. Pat. No. 8,891,224 B2.

Also within the scope of the invention is to provide a single terminal mounted on the cover of the case, and an electrical connection is provided from one of the electrodes of the capacitor element to the internal component of the terminal. The electrical connection may be a conductive lead, and the connection may be made according to the mechanism described with regard to two terminals. By way of example, the second electrode of the capacitor element may be electrically connected to the case and aligned axially, relative to the terminal mounted on the cover.

A plate is positioned inside the capacitor case, between the cover and the capacitor element. In one embodiment of the invention, the shape of the plate corresponds to a cross section of the receptacle of the case and is aligned approximately parallel to and spaced apart from the cover. The plate may be selected from a material that is non-conductive.

The function of the plate is to anchor the electrical connection between each of the terminals and an electrode of the capacitor element, whereby an increase in the distance between the cover and the plate breaks the electrical connection, thereby disconnecting the terminals. The distance between the cover and the plate may be a result of the cover expanding outwardly, the receptacle extending longitudinally or both, caused by an increase in pressure within the case.

The plate may be provided with first and second apertures, and the electrical connection between each of the terminals and the corresponding capacitor electrode can be made through an aperture. For example, the internal component of a terminal may be provided with a post inserted in an aperture, with a lead from a capacitor electrode welded or soldered to the bottom of the post on the side of the plate opposite the cover. When the distance between the cover and the plate increases in response to an increase in internal pressure, the terminal posts is pulled away from the plate, thereby tearing the weld and disconnecting the terminal.

In an alternative embodiment, the lead between a capacitor electrode and a terminal may be anchored to the plate and provided with a weakened section, such as a nick in the wire, at a position between the plate and the terminal, as is known in the art. When the distance between the cover and the plate increases, the increase in tension causes the wire to break.

The receptacle component of the case is characterized by (i) a static section located between the open end of the receptacle and the expandable section provided in the case, and (ii) a mobile section that extends longitudinally away from the open end of the receptacle, when sufficient pressure builds within in the case. The plate is attached to the mobile section of the receptacle, whereby movement of the mobile section away from the open end of the receptacle draws the plate away from the open end, as well. Additionally, movement of the plate towards the open end of the receptacle may be blocked by providing the plate with a flange extending towards the cover, whereby the flange butts against the underside of the cover to halt displacement of the plate. Alternatively, a flange extending from the underside of the cover or a spacer may be provided to restrict movement of the plate towards the cover.

BRIEF DESCRIPTION OF THE DRAWINGS

FIG. 1 is a side view of the capacitor of the present invention, prior to extension of the receptacle in response to pressurization within the case.

FIG. 2 is a cross section view of the capacitor, prior to extension of the receptacle in response to pressurization within the case.

FIG. 3 is a side view of the capacitor, after extension of the receptacle in response to pressurization within the case.

FIG. 4 is a cross section view of the capacitor, after extension of the receptacle in response to pressurization within the case.

FIG. 5 is a side view of the capacitor, after expansion of the cover in response to pressurization within the case.

FIG. 6 is a cross section view of the capacitor, after expansion of the cover in response to pressurization within the case.

FIG. 7 is a side view of a capacitor, after expansion of the bottom in response to pressurization within the case.

FIG. 8 is a cross section view of the capacitor of FIG. 7, after expansion of the bottom in response to pressurization within the case.

FIG. 9 is a side view of a capacitor having an expandable section located between the cover and the plate, after expansion of the receptacle in response to a pressurization within the case.

FIG. 10 is a cross section view of the capacitor of FIG. 9, after expansion of the receptacle in response to pressurization within the case.

FIG. 11 is a side view of a capacitor with a rigid cover, prior to extension of the receptacle in response to pressurization within the case.

FIG. 12 is a cross section view of the capacitor of FIG. 11, prior to extension of the receptacle in response to pressurization within the case.

FIG. 13 is a side view of a capacitor of FIG. 11, after extension of the receptacle in response to pressurization within the case.

FIG. 14 is a cross section view of the capacitor of FIG. 13, after extension of the receptacle in response to pressurization within the case.

DETAILED DESCRIPTION OF THE INVENTION

Without intending to limit the scope of the invention, the preferred embodiments and features are hereinafter set forth. All of United States patents and published applications cited in the specification are incorporated herein by reference. The term "polymer" or "polymeric" as used in the present application denotes a material having a weight average molecular weight ($M_w$) of at least 5,000. Unless otherwise indicated, conditions are 25° C., 1 atmosphere of pressure, and 50% relative humidity. Unless otherwise indicated, the term "connection" is intended to refer to an electrical connection, which, for example, may be made by wire, tabs or foils, and where appropriate, the connection is electrically insulated. Unless otherwise indicated, the terms "insulated", "insulator" and "insulating" are intended to refer to electrical insulation. The terms "film" and "sheet" are used in their general sense to describe materials that are thin in comparison to their length and breadth.

The capacitor of the present invention may be a film capacitor or an electrolytic capacitor.

Referring to FIGS. 1 and 2, a film capacitor constructed in accordance with the present invention is shown. Capacitor 1 has case 2 comprised of receptacle 3 and cover 4. Receptacle 3 has open end 5, side walls 6 and bottom 7. Additionally, receptacle 3 is provided with expandable section 8, located adjacent bottom 7. Cover 4 overlays open end 5 of receptacle 3 to seal case 2. Cover 4 is sufficiently flexible to expand outward, that is, away from open end 5, in response to an increase in pressure within the case. By way of example, cover 4 may expand outward a distance of from 1/16 inch to 1/2 inch, measured at the farthest point.

Case 2 is illustrated as being cylindrical, but may be a rectangular prism or other three-dimensional geometry, or combinations thereof. For example, the case may be in the shape of a rectangular prism, having a rectangular bottom and a rectangular cross-section with planar sides along the sleeve, which transitions to a circular top opening and terminal board. The term "side walls" is intended to include the lateral surface of a cylindrical case.

Case 2 is made from a material that is substantially impermeable to gases. By way of example, the case may be made out of metal, in particular, steels including cold-rolled steel, mild steel, stainless steel, and other alloys, copper, tantalum, aluminum, titanium, niobium, nickel, iron, and zinc. If the case material is susceptible to corrosion, either internally or externally, the material may be coated, plated or provided with other protective treatment, as is known to those skilled in the art. Alternatively, the case may be made from a synthetic polymeric material, such as a thermoplastic resin, thermoplastic elastomer or thermosetting resin.

Terminals 9 and 10 are mounted on cover 4 and insulated therefrom by insulators 11 and 12. Terminal 9 has threaded post 13, external to case 2, for connecting the capacitor to an electrical circuit. Terminal 9 has post 14, internal to case 2, for connecting the terminal to a capacitor electrode. Post 14 has flange 15, which is insulated from cover 4 by spacer 16.

Similarly, terminal 10 has external threaded post 17 and internal post 18, with flange 19 insulated from cover 4 by spacer 20.

Capacitor element 21 is positioned in receptacle 3 of case 2. Capacitor element 21 is comprised of two electrodes separated by a dielectric. By way of example, capacitor element 21 may be a film capacitor having wound, conductive sheets that are offset to provide common edge 22 at the top of capacitor element 21 and common edge 23 at the bottom of capacitor element 21. Capacitor element 21 has hollow core 24, located along a central axis formed by the wound sheets. An example of a film capacitor element useful in the present invention is disclosed in U.S. Pat. No. 8,098,479 B1.

An electrical connection between a first electrode of capacitor element 21 and terminal 9 is provided by lead 25, extending from common edge 22 to post 14 of terminal 9. Lead 25 may be welded at one end to common edge 22 and welded at the other end to post 14. An electrical connection between a second electrode of capacitor element 21 and terminal 10 is provided by lead 26 from common edge 23 to post 18 of terminal 10. Lead 26 may be welded at one end to common edge 23 and welded at the other end to post 18.

In place of welding, other methods of making the electrical connections between the components of the capacitor may be employed, such as soldering, brazing, compression, clinching or riveting.

The present invention may also be practiced with an electrolytic capacitor. For example, the electrical connection between the electrodes and the terminals may be leads connected at one end to the anode and cathode of a wound, capacitor element. Examples of electrolytic capacitor elements useful in the present invention is disclosed in U.S. Pat. No. 4,106,068 and U.S. Pat. No. 8,537,522 B2. Plate 27 is positioned in case 2 between cover 4 and capacitor element 21. Plate 27 is provided with flange 28, which extends upward from and abuts the underside of cover 4, around the perimeter of the open end 5 of receptacle 3. When cover 4 expands outward due to an increase in internal pressure, flange 28 restricts the outward movement of plate 27, and the distance between cover 4 and plate 27 increases. Plate 27 need not be in direct contact with cover 4, prior to the pressure interrupter mechanism being engaged. For example, a gap, designated "A" in FIG. 2, may be provided to create a buffer, so that a minor outward expansion of cover 4 will cause plate 27 to slide upward, without disconnecting the capacitor element from the terminals. Flange 28 has an additional function of maintaining plate 27 aligned perpendicular to side walls 6 of receptacle 3 and parallel to cover 4, when plate 27 is drawn away from cover 4 when expandable section 8 of receptacle 3 is activated by an increase in internal pressure. The alignment is important to ensure that all of the electrical connections to the terminals are broken, especially if there are more than two terminals mounted on the cover.

The plate is constructed from a material that possesses the strength necessary to transfer sufficient force to break the electrical connection between the terminals and the leads, when a buildup of pressure within the case forces the plate and the terminals apart. By way of example, the capacitor may be designed to break the electrical connections when the plate is separated from the terminals by a distance of from 1/16 inch to 3/4 inch. The plate may be a substantially non-conductive material, such as nylon 6,6, polybutylene terephthalate, and epoxy resin impregnated fiberglass. Alternatively, the terminals and leads may be locally insulated from the plate.

Referring to FIGS. 2, 4 and 6, plate 27 is provided with apertures 29 and 30, which extend perpendicularly through the width of the plate. Post 14 of terminal 9 extends through aperture 29 and is welded on an underside of plate 27 to lead 25. Post 18 of terminal 10 extends through aperture 30 and is welded on an underside of plate 27 to lead 26. Referring to FIGS. 3-6, an increase in the distance between the terminals 9 and 10 and plate 27, either because cover 4 expands outward, plate 27 is drawn away from the terminals when the expandable section of receptacle 3 is activated, or both, breaks the weld between posts 14 and 18, which are displaced, and leads 25 and 26, which are anchored to plate 27, respectively.

It can be understood that alternative means may be employed to anchor the electrical connections between the terminals and the capacitor element electrodes, such that increasing the relative distance between cover 4 and plate 27 severs the electrical connections. For example, leads 25 and 26 may extend through apertures 29 and 20 and be connected to terminals 9 and 10, respectively, in the space above plate 27. Leads 25 and 26 may be anchored to plate 27, and nicked or otherwise weakened at a location between plate 27 and the terminals. When the distance between cover 4 and plate 27 increases, the increase in tensile force breaks the leads, and thus the electrical connection between capacitor element 21 and terminals 9 and 10 is broken.

Plate 27 is attached to receptacle 3, either directly or indirectly, whereby longitudinal extension of receptacle 3 draws plate 27 away from the open end 5 and cover 4. By way of example, coupler 35 includes, bolt 31 with head 32 functioning as a flange engaging the upper side of plate 27. Bolt 31 is threaded into the upper end 34 of shaft 33 of coupler 35. Lower end 36 of shaft 33 is attached to fitting 37, extending upward from bottom 7 of receptacle 3. By way of example, fitting 37 may be a threaded male or female connection, snap-fit or press-fit connection corresponding to and capable of engaging coupler 35. If fitting 37 is inserted through an opening in bottom 7 of receptacle 3, the opening is sealed by welding, soldering or a gasket.

The coupler attaching the plate to the portion of the receptacle that extends longitudinally under pressure may be selected from rigid structures, such as rods, shafts and tubes, or from flexible structures, such as cables, cords and straps having sufficient tensile strength to break the electrical connection between the terminals and the capacitor element electrodes, when the plate is drawn axially away from the cover. The method of attaching the plate to the receptacle via the coupler will vary depending upon the structure selected and may include threaded male or female connectors, pine tree fasteners, snap-fits, press-fits, such as knurled shafts, hook and eye fasteners, carabiner, rings, toggle bolts, cotter pins, rivets and welding.

While the capacitor of the present invention is illustrated with coupler 35 attached to plate 27 in a single location, for example by bolt 31, space 38 between plate 27 and capacitor element 21 allows sufficient room to install a fitting that (i) attaches the coupler to the plate at multiple points; and/or (ii) allows for an electrical connection through an aperture located in the center of the plate.

Referring to FIGS. 3 and 4, the electrical connection between capacitor element 21 and terminals 9 and 10 may be broken by an increase in pressure within case 2 that causes expandable section 8 to activate, thereby causing receptacle 3 to extend longitudinally, shown as distance "B". In particular, when expandable section 8 is activated, coupler 35 is pulled downward away from open end 5 of receptacle 3, thereby pulling plate 27 away from cover 4 and breaking the electrical connections between terminal 9 and lead 25 and terminal 10 lead 26. In the embodiments of the invention illustrated in FIGS. 1-8, space 38 is provided between plate 27 and the top of capacitor element 21, to allow the plate to slide downward, relative to the capacitor element, that is, coupler 35 slides relative to hollow core 24 of capacitor element 21. Alternatively, space could be provided within the case to allow the capacitor element to slide relative to the case, along with coupler 35 and plate 27.

Expandable section 8 may be an inward bead formed in receptacle 3 by a grooving machine, followed by axial compression. For example, receptacle 3 may be aluminum or steel. Alternatively, expandable section 8 may be formed in a receptacle made of a thermoplastic or thermosetting polymer material. The expandable section created in the side walls of the receptacle may be an inner or outer bead that has been compressed, or a folded, pleated or bellows structure.

The location of expandable section 8 in the lower ½ or even the lower ¼ of receptacle 3 is advantageous, because capacitor 1 may be installed in an electric circuit and clamped in place at a location above expandable section 8, and expandable section will activate when a fault occurs. Even if capacitor 1 is installed on a busbar that blocks expansion of cover 4 and clamped in place, expandable section 8 is free to activate.

The present invention has the advantage of being readily adaptable to incorporate a bridge type pressure interrupter, which is useful for those installations in which cover 4 is free to expand outward when a fault occurs. Referring to FIGS. 5 and 6, the electrical connections between terminals 9 and 10 and leads 25 and 26, respectively, are broken by expansion of cover 4 away from the open end 5 of receptacle 3, shown as distance "C." An additional feature, however, provided by coupler 35 connecting plate 27 and bottom 7 of receptacle 3 is that the center of plate 27 is anchored from flexing upward when cover 4 expands. For example, even if expandable section 8 is blocked from extending longitudinally along the axis of case 2, the downward force against bottom 7 is transferred to plate 27.

Referring to FIGS. 7 and 8, an alternative embodiment of the invention is shown, wherein the expandable section is located in the bottom, rather than the side walls of the receptacle. Case 39 has receptacle 40 and cover 41. Receptacle 40 has open end 42, side walls 43 and flexible bottom 44. Terminals 45 and 46 are mounted on cover 41. Electrical connections between terminals 45 and 46 and the electrodes of capacitor element 47 are provided by leads 48 and 49, respectively. The terminals and leads are connected on the underside of plate 50. The structure and function of the cover, terminals, capacitor element and electrodes, leads and plate are substantially the same as described with regard to capacitor 1, in FIGS. 1-6.

The expandable section of receptacle 40, which forms the mobile component that extends longitudinally during an increase in internal pressure within case 39 is flexible bottom 44. The bottom may be constructed with material and properties similar to that of cover 41, that is, bottom 44 will expand outward to create a dome-shaped extension to capacitor 51, when a pressure generating fault occurs, shown as distance "D."

Bottom 44 is attached to plate 50 by coupler 52, axially positioned within case 39 and capacitor element 47. Bolt 53 secures plate 50 to one end of coupler 52. The opposite end of coupler 52 is attached to the bottom 44 of receptacle 40 by fitting 54. The structure and function of coupler 54 and the means for attaching plate 50 to bottom 44 are substantially the same as with regard to capacitor 1, as shown and described herein. The expansion of bottom 44 of receptacle 40 causes separation between terminal 45 and lead 48 and between terminal 46 and lead 49, shown as distance "E", thereby breaking the electrical connections.

The bottom of receptacle 40 may be recessed, to allow outward expansion of bottom 44, even if lower perimeter 55 of receptacle 40 is placed against another object, as shown in U.S. Pat. No. 4,577,257.

Another alternative of the embodiment is shown in FIGS. 9 and 10. Capacitor 56 has case 57, with receptacle 58 and cover 59. Receptacle 58 has open end 60, side walls 61 and bottom 62. Terminals 63 and 64 are mounted on cover 59. Electrical connections between terminals 63 and 64 and the electrodes of capacitor element 65 are provided by leads 66 and 67, respectively. The terminals and leads are connected on the underside of plate 68, which is attached to the bottom 62 of receptacle 58 by coupler 69. The structure and function of the cover, terminals, capacitor element and electrodes, leads, coupler and fittings, as well as the plate, are substantially the same as described with regard to capacitor 1, in FIGS. 1-6.

Receptacle 58 has expandable section 70 located in side walls 61, between open end 60 of receptacle 58 and plate 68. Expandable section 70 may be selected from the structures described with regard to expandable section 8 of capacitor 1. The portion of receptacle 58 below expandable section 70 constitutes the mobile section, which extends longitudinally, when sufficient internal pressure builds, shown as distance "F." Plate 68 may be attached to receptacle 58 by a coupler between the plate and bottom 62. Alternatively, plate 68 may be drawn away from open end 60 and terminals 63 and 64 by virtue of, for example, an inward projection formed in receptacle 58 between plate 68 and expandable section 70. In the embodiment illustrated, capacitor element 65 is drawn with plate 68 and the mobile section of receptacle 58, when expandable section 70 is activated, thereby breaking the electrical connections between the terminals and the leads.

It can be understood that the present invention may be practiced without a flexible cover, that is, a single pressure interrupter mechanism is incorporated in the expandable section of the receptacle. In other words, the sole mechanism for pressure interruption would be an expandable section incorporated into the receptacle, whereby activation resulting from an increase in pressure within the case will extend the receptacle longitudinally, drawing the plate away from the terminals thereby breaking the electrical connection.

Referring to FIGS. 11-14, capacitor 71 has case 72, with receptacle 73 and cover 74. Cover 74 may be rigid and designed, for example, to mount the capacitor on a busbar. Receptacle 73 has open end 75, walls 76 and bottom 77. Expandable section 78 is positioned in side wall 76, adjacent bottom 77. Terminals 79 and 80 are mounted on cover 74. Electrical connections between terminals 79 and 80 and the electrodes of capacitor element 81 are provided by leads 82 and 83, respectively. The terminals and leads are connected to each other on the underside of plate 84. The structure and function of the terminals, capacitor element and electrodes, leads and plate are substantially the same as described with regard to capacitor 1, in FIGS. 1-6.

Plate 84 of capacitor 71 is attached to receptacle 73 by coupler 85. Coupler 85 includes shaft 86 having lower end 87 attached to fitting 88 on the bottom 77 of receptacle 73, and upper end 89 attached to plate 84. The attachment mechanism connecting plate 84 to shaft 86 includes connector 90 having a threaded end 91 screwed into an internal thread in shaft 86 and a knurled end 92 extending upward. Bushing 93 is press-fitted onto knurled end 92. Head 94 of busing 93 engages the upper side of plate 84. The attachment mechanism illustrated in FIGS. 12 and 14 is believed to provide certain advantages in terms of simplifying the method of assembling the capacitor and may be used in any of the embodiments of the invention disclosed herein, specifically in the capacitors illustrated in FIGS. 1-10.

Referring to FIGS. 13 and 14, expandable section 78 is has been activated by an increase in pressure within capacitor 71, shown by distance "G." Plate 84 has been drawn down axially away from cover 74 and terminals 79 and 80, shown as distance "H", thereby breaking the electrical connection between terminals 79 and 80, and leads 82 and 83, respectively.

The foregoing embodiment of the invention may even be practiced with an electrolytic capacitor having glass hermetic seals, which insulate the terminals as they pass through the cover. By way of example, suitable electrolytic capacitors are disclosed in U.S. Pat. No. 7,206,186 B1 and U.S. Pat. No. 7,274,551 B1.

There are, of course, many alternative embodiments and modifications of the invention intended to be included in the following claims.

What we claim is:

1. A capacitor, comprising:
   (a) a case having a receptacle, with an open end, side walls and a bottom opposite the open end, the receptacle further having an expandable section, and a flexible cover overlaying the open end and sealing the case, whereby an increase in pressure within the case forces the cover to expand outwardly and a mobile section of the receptacle to extend longitudinally;
   (b) a capacitor element positioned inside the case having first and second electrodes;
   (c) first and second terminals mounted on the cover, with each of the terminals extending through the cover;
   (d) a plate positioned inside the case between the cover and the capacitor element, wherein the plate is attached to the mobile section of the receptacle such that when the mobile section extends longitudinally, the plate is pulled away from the open end of the receptacle;
   (e) a first lead forming a first electrical connection between the first electrode of the capacitor element and the first terminal, whereby the first electrical connection is anchored to the plate and breakable by the cover expanding outwardly or the receptacle extending longitudinally; and
   (f) a second lead forming a second electrical connection between the second electrode of the capacitor element and the second terminal, whereby the second electrical connection is anchored to the plate and breakable by the cover expanding outwardly or the receptacle extending longitudinally.

2. The capacitor of claim 1, further comprising a coupler having one end attached to the plate and an opposite end attached to the bottom of the receptacle, whereby longitudinal extension of the mobile section of the receptacle in response to an increase in pressure within the case pulls the plate away from the open end of the receptacle and breaks (i) the first electrical connection between the first electrode and the first terminal, and (ii) the second electrical connection between the second electrode and the second terminal.

3. The capacitor of claim 2, wherein the expandable section of the receptacle is a bellows positioned in the side walls of the receptacle.

4. The capacitor of claim 2, wherein the bottom of the receptacle is flexible and expands outwardly in response to an increase in pressure in the case.

5. The capacitor of claim 2, wherein the capacitor element has a hollow core and the coupler extends through the hollow core and is slidable relative to the capacitor element.

6. The capacitor of claim 2, wherein the coupler is a shaft and the one end of the coupler is a bolt threaded into the shaft, the bolt having a head engaging the plate on a side of the plate facing the cover.

7. The capacitor of claim 2, wherein the coupler is a shaft and the one end of the coupler is a bushing press-fit onto the shaft, the bushing having a head engaging the plate on a side of the plate facing the cover.

8. The capacitor of claim 1, wherein the capacitor element remains stationary relative to the open end of the receptacle when the mobile section of the receptacle extends longitudinally in response to an increase in pressure in the case.

9. The capacitor of claim 1, wherein (i) the first terminal comprises a first post positioned in a first aperture in the plate and the first lead is welded to the first post adjacent a side of the plate opposite the cover; and (ii) the second terminal comprises a second post positioned in a second aperture in the plate and the second lead is welded to the second post adjacent the side of the plate opposite the cover.

10. A capacitor, comprising:
(a) a case having a receptacle, with an open end, side walls and a bottom opposite the open end, the receptacle further having an expandable section, and a cover overlaying the open end and sealing the case, whereby an increase in pressure within the case forces a mobile section of the receptacle to extend longitudinally;
(b) a capacitor element positioned inside the case, the capacitor element having an electrode;
(c) a terminal mounted on the cover and extending through the cover;
(d) a plate positioned inside the case between the cover and the capacitor element, wherein the plate is attached to the mobile section of the receptacle such that when the mobile section extends longitudinally, the plate is pulled away from the open end of the receptacle; and
(e) a lead forming an electrical connection between the electrode of the capacitor element and the terminal, whereby the electrical connection is anchored to the plate and breakable by the receptacle extending longitudinally.

11. The capacitor of claim 10, further comprising a coupler having one end attached to the plate and an opposite end attached to the bottom of the receptacle, whereby longitudinal extension of the mobile section of the receptacle in response to an increase in pressure within the case pulls the plate away from the open end of the receptacle and breaks the electrical connection between the electrode and the terminal.

12. The capacitor of claim 11, wherein the cover is flexible and an increase of pressure within the case forces the cover to expand outwardly away from the plate and break the electrical connection between the electrode and the terminal.

13. The capacitor of claim 11, wherein the capacitor element has a hollow core and the coupler extends through the hollow core and is slidable relative to the capacitor element.

14. The capacitor of claim 11, wherein the coupler is a shaft and the one end of the coupler is a bolt threaded into the shaft, the bolt having a head engaging the plate on a side of the plate facing the cover.

15. The capacitor of claim 11, wherein the coupler is a shaft and the one end of the coupler is a bushing press-fit onto the shaft, the bushing having a head engaging the plate on a side of the plate facing the cover.

16. The capacitor of claim 10, wherein the cover is flexible and an increase of pressure within the case forces the cover to expand outwardly away from the plate and break the electrical connection between the electrode and the terminal.

17. A capacitor, comprising:
(a) a case having a receptacle, with an open end, side walls and a bottom opposite the open end, the receptacle further having an expandable section, and a cover overlaying the open end and sealing the case, whereby an increase in pressure within the case forces a mobile section of the receptacle to extend longitudinally;
(b) a capacitor element positioned inside the case having first and second electrodes;
(c) first and second terminals mounted on the cover, with each of the terminals extending through the cover;
(d) a plate positioned inside the case between the cover and the capacitor element, wherein the plate is attached to the mobile section of the receptacle such that when the mobile section extends longitudinally, the plate is pulled away from the open end of the receptacle;
(e) a first lead forming a first electrical connection between the first electrode of the capacitor element and the first terminal, whereby the first electrical connection is anchored to the plate and breakable by the receptacle extending longitudinally; and
(f) a second lead forming a second electrical connection between the second electrode of the capacitor element and the second terminal, whereby the second electrical connection is anchored to the plate and breakable by the receptacle extending longitudinally.

18. The capacitor of claim 17, further comprising a coupler having one end attached to the plate and an opposite end attached to the bottom of the receptacle, whereby longitudinal extension of the mobile section of the receptacle in response to an increase in pressure within the case pulls the plate away from the open end of the receptacle and breaks (i) the first electrical connection between the first electrode and the first terminal, and (ii) the second electrical connection between the second electrode and the second terminal.

19. The capacitor of claim 18, wherein the capacitor element has a hollow core and the coupler extends through the hollow core and is slidable relative to the capacitor element.

20. The capacitor element of claim 18, wherein the coupler is a shaft and the one end of the coupler is selected from the group consisting of (i) a bolt threaded into the shaft, the bolt having a head engaging the plate on a side of the plate facing the cover; and (ii) a bushing press-fit onto the shaft, the bushing having a head engaging the plate on a side of the plate facing the cover.

* * * * *